United States Patent

Mathews et al.

[11] Patent Number: 5,816,299
[45] Date of Patent: Oct. 6, 1998

[54] DISC SAW FELLING HEAD CHIP DISCHARGE

[75] Inventors: Michael J. Mathews, Brantford; Henry J. Stulen, Paris; Riana D. Zyma, London, all of Canada

[73] Assignee: Timberjack Inc., Woodstock, Canada

[21] Appl. No.: 954,456

[22] Filed: Oct. 20, 1997

[51] Int. Cl.$^6$ .................................................. A01G 23/08
[52] U.S. Cl. ..................... 144/34.1; 144/4.1; 144/335; 144/336; 30/379.5; 83/78; 83/109
[58] Field of Search .................................. 144/4.1, 34.1, 144/252.1, 252.2, 335, 336; 30/379, 379.5; 83/928, 78, 109

[56] References Cited

U.S. PATENT DOCUMENTS

| | | | |
|---|---|---|---|
| 4,932,447 | 6/1990 | Morin | 144/34.1 |
| 4,987,935 | 1/1991 | Corcoran et al. | 30/379.5 |
| 5,113,919 | 5/1992 | MacLennan | 144/34.1 |

OTHER PUBLICATIONS

Applicant's Exhibit A—Timberjack "2618/2628 Level Swing Feller Bunchers" brochure, two pages, admitted prior art.

Applicant's Exhibit B—Photo of Denharco "Snowblower" type discharge, admitted prior art.

Applicant's Exhibit C—Photos of Hydro–Ax 22 Ex Bunching Saw discharge, admitted prior art.

Applicant's Exhibit D—Page 5 of "Tigercat Safety Bulletin" showing prior art chip spray patterns, admitted prior art.

Applicant's Exhibit E—Page 12 of "Tigercat Safety Bulletin" discussing Saw housing entrance and exit space, admitted prior art.

*Primary Examiner*—W. Donald Bray
*Attorney, Agent, or Firm*—Quarles & Brady

[57] ABSTRACT

A disc saw felling head has a window in a sidewall of the head through which chips are discharged in a tangent plane and a discharge chute over the window. The chute has a top wall and inner and outer sidewalls shaped so that chips exiting the head through the window are directed along a chip path which is generally parallel to the tangent plane and first turns further rearward and then turns outward through a lateral discharge opening in the chute.

9 Claims, 3 Drawing Sheets

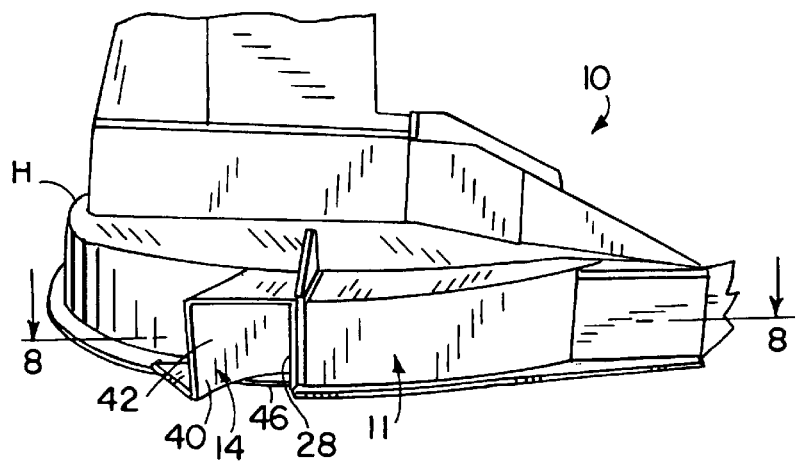
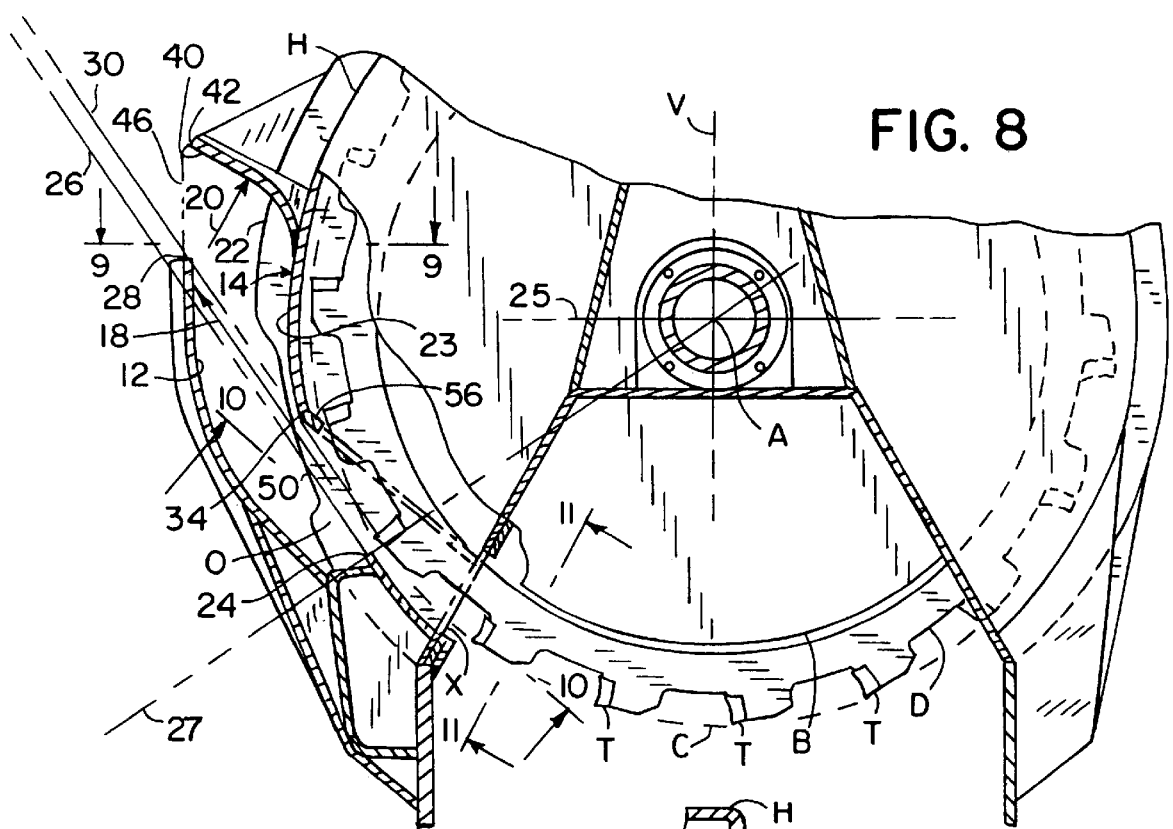
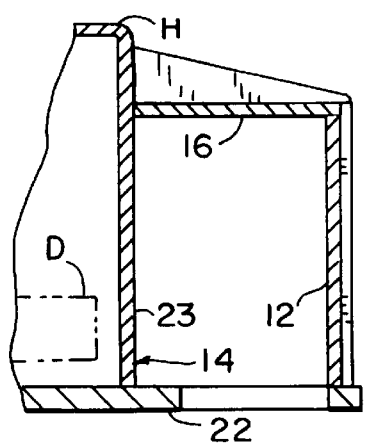

DISC SAW FELLING HEAD CHIP DISCHARGE

BACKGROUND OF THE INVENTION

1. FIELD OF THE INVENTION

This invention relates to disc saw felling heads of the type that are used in tree feller bunchers, and in particular to a construction for managing the path of chips which are cut from the kerf.

2. DISCUSSION OF THE PRIOR ART

Feller bunchers are well known and are used for harvesting standing trees. In one type, a disc having peripheral teeth is rotated about a generally vertical axis and is advanced through the tree so that the teeth cut a horizontal kerf in the tree trunk. The teeth have radially outward tips which actually do the cutting of the wood fibers in the kerf. When the tips are advanced all the way through the tree, the cut end of the tree is rested on a butt plate which overlies the disc, radially inward of the teeth. The butt plate is supported by the housing of the felling head, which encloses the teeth in the zone behind the cutting and accumulating pocket. The teeth are exposed at the front of the cutting and accumulating pocket, which is necessary so as to expose them to the tree for cutting. The pocket is circumscribed on its sides and rear by pocket walls. The pocket walls extend generally vertically and help restrain trees as several cut trees are accumulated on top of the butt plate in the pocket. Several trees are typically accumulated in the pocket before they are laid down to be transported or "skidded" to the roadside for loading onto a truck.

The cutting discs are relatively large in diameter (e.g. five feet) and are rotated at relatively high speed (e.g. 1,200 rpm). Thus, considerable energy is stored in the spinning disc, enough to fell a large tree in a matter of seconds.

The height of the kerf is relatively high, on the order of about an inch or more. Thus, the volume of chips removed from the kerf is relatively high. Also, with all the energy stored by the disc, the chips are thrown a considerable distance. Rocks, dirt or other debris that get into the tooth path can be thrown even further. Consequently, to limit the ingestion of such debris from the ground, trees are cut relatively high, leaving taller stumps and shorter cut trunks, which is undesirable.

As mentioned above, the teeth are only exposed outside of the housing for a limited angle of the head, at the front of the pocket. At the downstream side of the pocket. (downstream meaning in the direction of rotation of the disc or in the direction of chip flow) there is a housing entry opening in the housing where the teeth re-enter the housing. It is a problem when so many chips or other objects are ingested through this opening into the housing so that the housing clogs, which wastes energy by slowing down the disc and causes wear to the disc, teeth and housing.

FIGS. 1 and 2 show front and top views, respectively, of a typical disc saw feller buncher head having a pocket P, a disc D, teeth T spaced about the periphery of the disc, a butt plate B forming part of the housing H, and pocket walls W. Arms A are hydraulically operated to hold cut trees over the butt plate B. The head is secured to the front of a tractor or similar vehicle (e.g., a track vehicle) and operated by the operator of the vehicle to selectively fell and bunch trees as described above.

FIG. 3 illustrates a prior art head, particularly in the area of the housing entry opening of the head. FIG. 3 illustrates the opening X, which is formed in the downstream pocket wall at the mouth of the pocket. While it is desirable to keep the entry opening X as small as possible, in prior art head constructions chips were still thrown or pushed into the opening X to an extent that clogging was a problem, or to an extent such that some form of chip management was necessary to operate the feller efficiently.

FIGS. 4 and 5 illustrate aspects of chip management in various prior art felling head constructions. In FIG. 4, a chip discharge window O is cut in the housing H just downstream of the opening X (FIG. 3) where the teeth enter the housing H. The window O is meant to provide a space for throwing the chips out of the housing H after they enter it. As illustrated, the chips are thrown generally tangentially, in a tangent plane, which is the plane of the circular tooth path. If made too small, such windows are prone to becoming clogged. On the other hand, oversizing such windows can cause chips exiting the window O to be thrown relatively large distances to the side of and in back of the head over a large area.

FIG. 5 illustrates a prior art construction somewhat similar to that shown in FIG. 5, but in which the window O is covered by a deflection plate E, which chips are intended to bounce off of and be directed downwardly. While this solves the problem of throwing the chips to the side and in back of the head, this construction is particularly prone to becoming clogged, as chips are not: only restricted by the window O, but can become wedged in the duct formed between the window O and the plate E.

SUMMARY OF THE INVENTION

The invention provides a construction of a disc saw felling head which manages chip flow by providing a discharge chute on the housing of the head that is not prone to clogging and directs chips so as to reduce their momentum. The chute provides a chip flow path that directs chips along the tangent plane in a nonlinear path. Energy is dissipated from the chips as they pass through the chute so that they are not thrown as far away from the head, or over as broad of an area.

The invention accomplishes this by extending the discharge chute laterally and rearwardly of the discharge window. The chute has a top wall closing a top of the chute and an outside wall spaced radially outward of the window and of the housing sidewall. The outside wall extends rearwardly from the window by a distance such that the outside wall intersects a tangent line which intersects the upstream edge of the window and is perpendicular to a radial line which intersects the upstream edge. Preferably, the outside wall extends further rearwardly to at least a position at which the outside wall intersects the tangent line that intersects the downstream edge of the window. Chips are discharged from the chute rearward of the outside wall, through a discharge opening provided in the chute.

In an especially useful aspect, the discharge opening of the chute faces radially outwardly from the saw blade housing. In this aspect, an inside wall of the chute extends downstream of the downstream edge of the outside wall and turns outwardly away from the head to define a back wall at the rearward side of the discharge opening. Chips deflected rearwardly by the outside wall are directed against the back wall, preferably at an outward angle of 90° or greater, so as to be directed with reduced energy out through the discharge opening.

In another useful aspect, the bottom of the chute is open. Thereby, chips which are depleted of so much energy that they cannot traverse the entire duct can drop out through the bottom. In this way, the duct is also self cleaning to a large extent.

The foregoing and other objects and advantages of the invention will appear from the detailed description and drawings, which describe and illustrate a preferred embodiment of the invention.

BRIEF DESCRIPTION OF THE DRAWINGS

FIG. 6 is a fragmentary perspective side view of a felling head incorporating a discharge chute of the invention;

FIG. 8 is a partial sectional view from the plane of the line 8—8 of FIG. 6; and FIG. 9 is a partial sectional view from the plane of the line 9—9 of FIG. 8.

DETAILED DESCRIPTION OF THE PREFERRED EMBODIMENT

Figure 4:
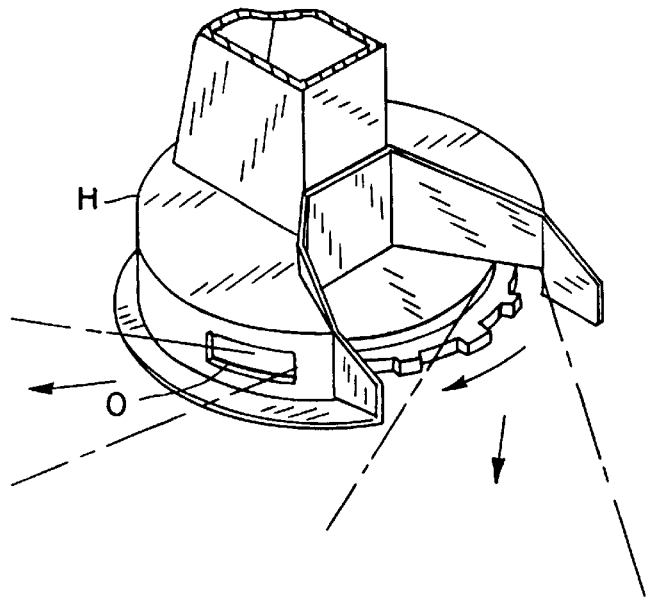
FIG. 4 is a fragmentary perspective view of a prior art disc saw felling head of the type shown in FIGS. 1–3, illustrating a chip discharge window O in the side of the housing and illustrating with phantom lines and straight arrows chip discharge directions.
Figure 5:
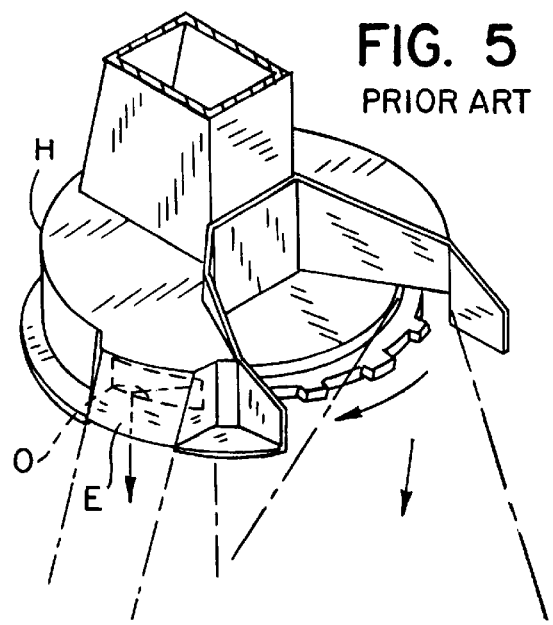
FIG. 5 is a view similar to FIG. 4, but with a deflection plate E provided over the window O.
Figure 1:
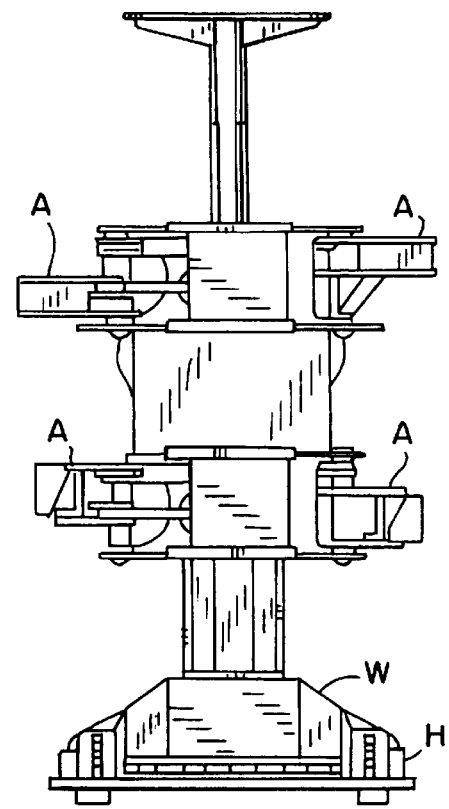
FIG. 1 is a front plan view of a typical disc saw feller buncher head to which the present invention can be applied.
Figure 2:
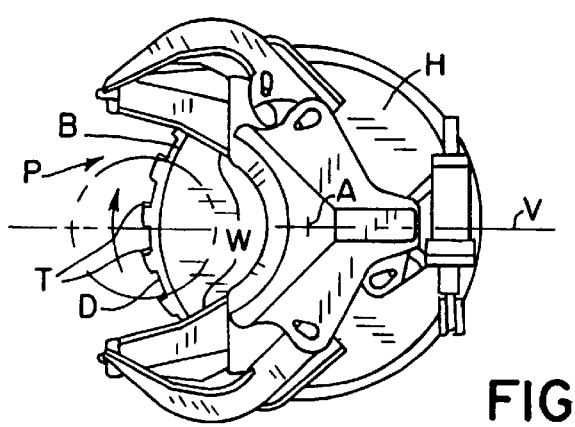
FIG. 2 is a top plan view of the feller buncher head of FIG. 1.
Figure 3:
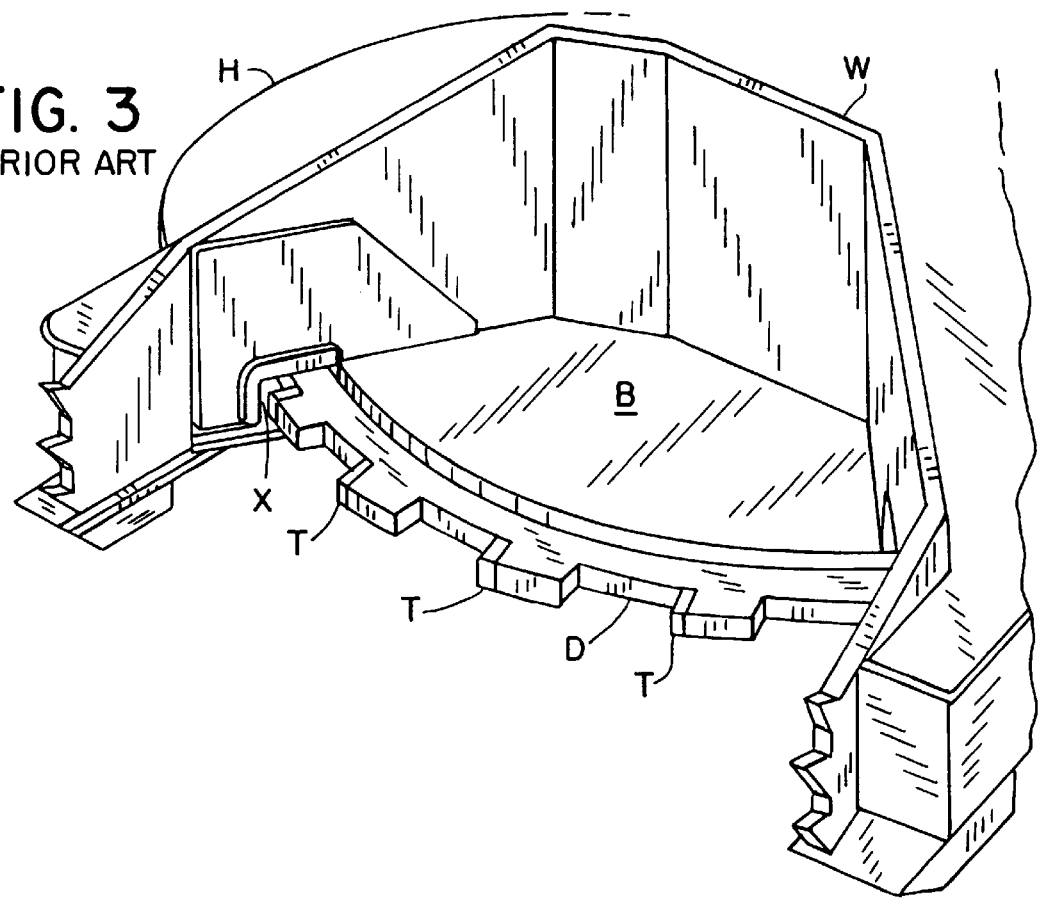
FIG. 3 is a perspective view illustrating a prior art construction of a felling head housing entry opening into the housing.
Figure 7:
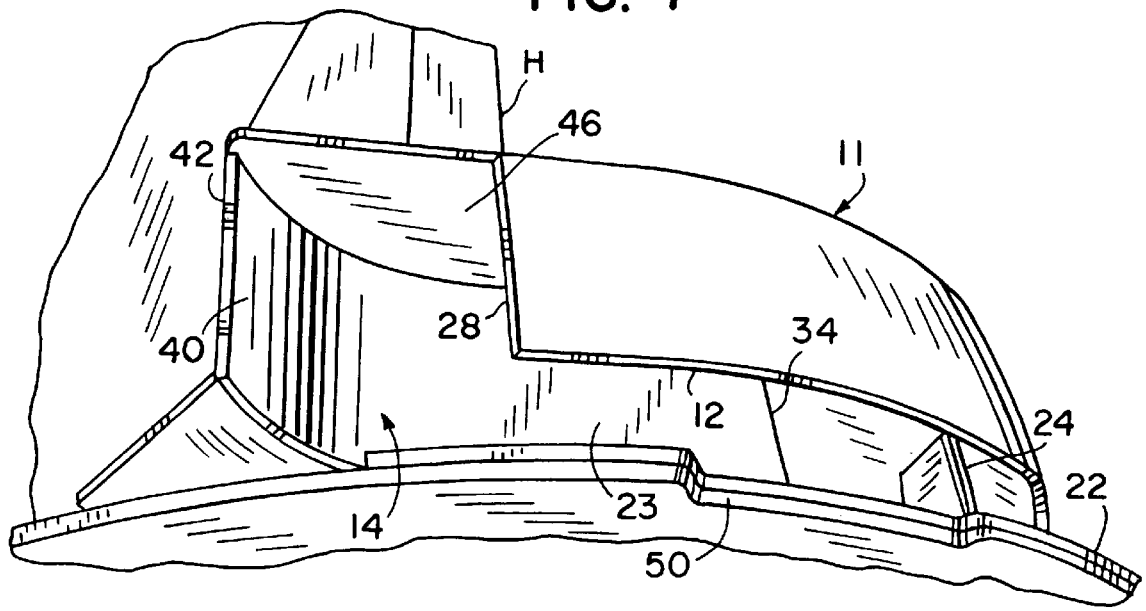
FIG. 7 is a bottom perspective view of the discharge chute portion of the head of FIG. 6.

Referring to FIGS. 6–8, a felling head 10 of the type shown in FIGS. 3 and 4 is illustrated which incorporates a discharge chute 11 of the invention. The chute 11 is added to such a felling head over the window O formed in the sidewall of the housing H so as to direct chips exiting the housing H through the window a along a chip path generally indicated by the arrows 18 and 20 in FIG. 8.

The chute 11 is of welded steel plate construction and has an outside wall 12, an inside wall 14 and a top wall. 16. The chute 11 is open at the bottom, except for a lip or rim 22 which is an extension of the bottom guard plate of the housing H and extends a short distance radially beneath the chute 11.

The outside sidewall 12 is formed by a curved plate which extends from the housing H adjacent to the upstream edge 24 of the window O. As the outside wall 12 extends downstream in the direction of chip flow through the chute 11, the wall 12 extends rearwardly and angles away from the housing sidewall 23, which forms the chute sidewall 14 adjacent to the window O. As the wall 12 angles out, it curves inwardly so that at approximately 90° downstream from front dead center of the disc D, the wall 12 is perpendicular to a radial line (i.e., a line drawn in the tangent plane of the tooth path C through the axis of rotation A of the disc D) at the 90° position, i.e., the wall 12 is perpendicular to line 25. The wall 12 continues rearwardly straight back in the machine direction V from this point at least far enough so that it intersects line 26. Line 26 is a tangent line in the tangent plane of the tooth path C which intersects upstream edge 24 of the window W and is perpendicular to radial line 27 which intersects the upstream edge 24.

If the wall 12 ended at line 26, some chips may still escape from the duct without first being deflected by the wall 12. Thus, the wall 12 preferably continues further downstream, generally straight rearwardly in the direction V of machine travel, to its downstream edge 28, which is intersected by line 30. Line 30 is also perpendicular to line 27, but intersects downstream edge 34 of the window W. Thus, in the preferred embodiment, line 30 defines the downstream edge 28 of the outside wall 12. That being the case, most, if not all, of the chips exiting the window W will hit the wall 12 and be deflected further rearwardly by it.

Chips hitting the wall 12 are deflected in the general direction indicated by arrow 20, toward the back wall 40, which forms the downstream end of the inside wall 14, downstream of the end 28 of wall 12. The back wall 40 is directed so that chips hit it at an outside angle (the outwardly opening angle between line 20 and the wall 40) of 90° or greater. For this to occur, the wall 40 should be directed so as to form an outside angle of 90° or greater with a line which is parallel to a line which intersects the tangent line 26 at the outside wall 12 and which is in a direction such that an angle between the line and the tangent line 26 is bisected by a line which is perpendicular to the outside wall 12.

With this the case, chips hitting the back wall 40 at a right angle or near to a right angle with little or no radial momentum will fall out of the chute 11 through the open bottom, much of the momentum energy of them having been dissipated by first hitting the wall 12 and then the wall 40. However, many chips will hit the wall 40 at a glancing blow, and still have outward radial momentum. Thus, between the downstream end 28 of the wall 12 and the downstream end 42 of the wall 40, a chute discharge opening 46 which faces radially outwardly is defined. Chips may exit the chute laterally through the opening 46, along the general direction of the tangent plane. At the discharge opening 46, the chip stream, which diverges in all directions as it travels through and beyond the chute 11, will have diverged so as to be larger in cross-section than the window O, and may be larger than the cross-section of the discharge opening 46. This is permissible since the bottom of the chute 11 is open.

Referring particularly to FIG. 8, the rim 22 is undercut in the area at 50, where it crosses under the lines 26 and 30. This is to help reduce the chance of the chute 11 becoming choked in this area, since in this area the outside wall 12 is converges toward the housing wall 23. Of course, undercutting the rim 22 as at 50 would be unnecessary if the entire rim 22 was of smaller radial extent, or if the wall 12 were spaced further from the wall 23. However, moving the wall 12 further out increases the overall width of the head, and so is not desirable.

The chute 11 may be applied to any disc saw felling head in which a chip discharge window is provided in the sidewall of the disc housing through which chips are discharged laterally, in a generally tangential rearward direction. An example of such a felling head is the Timberjack 2628 Feller Buncher, which is commercially available from Timberjack Corporation, Atlanta, Ga.

The chute 11 may be provided by any suitable construction. In the preferred embodiment, it is of welded, steel plate construction, permanently attached to the housing with reinforcements as illustrated or in any other manner. The chute 11 could, however, be provided as an attachment, which could be bolted or otherwise removably fastened to a felling head.

A preferred embodiment of the invention has been described in considerable detail. Many modifications and variations to the preferred embodiment will be apparent to those skilled in the art. For example, a downwardly angled baffle could be provided over and outside of the discharge opening 46 so as to deflect chips downwardly. Therefore, the invention should not be limited to the embodiment described, but should be defined by the claims which follow.

We claim:

1. In a disc saw felling head of the type having:

a rotary blade disc which is rotatable about a generally vertical axis of rotation and has peripheral teeth with radially outer cutting tips;

a housing for enclosing said teeth in a rearward shielded zone of said head and exposing said teeth to a tree in a forward cutting pocket of said head, said teeth moving in a tangent plane along a circular tooth path from said pocket into said shielded zone at a housing entry opening in said housing when said blade is rotated, said housing enclosing said disc in said shielded zone and having a sidewall with a window in said sidewall for discharging wood chips laterally from said chamber, said window being formed in said sidewall downstream from said housing entry opening along said tooth path and having an upstream edge at an upstream radial position and a downstream edge at a downstream radial position;

the improvement wherein:

a discharge chute intersected by said tangent plane extends laterally from said housing over said window, said chute having a top wall closing a top of said chute and an outside wall spaced radially outward of said window and of said chamber sidewall, said outside wall extending rearwardly from said window by a distance such that said outside wall intersects a first tangent line in said tangent plane which intersects said upstream edge of said window and which is perpendicular to a radial line which intersects said upstream edge, and wherein said chute has a discharge opening rearward of said outside wall.

2. The improvement of claim 1, wherein said discharge opening faces so as to discharge wood chips generally parallel to said tangent plane.

3. The improvement of claim 1, wherein said chute discharge is at a downstream edge of said outside wall.

4. The improvement of claim 1, wherein said chute discharge faces radially outwardly from said housing.

5. The improvement of claim 1, wherein a bottom of said chute is open.

6. The improvement of claim 1, wherein said outside wall extends rearwardly to at least a position at which said outside wall intersects a second tangent line in said tangent plane, said second tangent line intersecting said downstream edge of said window and being perpendicular to said radial line.

7. The improvement of claim 1, wherein said chute has an inside wall spaced opposite from said outside wall and said inside wall extends downstream of a downstream edge of said outside wall and defines a back wall at a rearward side of said discharge opening which is opposite from said downstream edge of said outside wall.

8. The improvement of claim 7, wherein said back wall is at an outward angle of 90° or more to a line in said tangent plane which intersects the first tangent at the outside wall and which is in a direction such that an angle between said line and said first tangent is bisected by a line which is perpendicular to said outside wall.

9. The improvement of claim 1, wherein said housing has a bottom wall rim which extends radially outwardly from said housing beneath said chute and said rim has a radial inward undercut below where said first tangent line passes over said rim.

\* \* \* \* \*